UNITED STATES PATENT OFFICE.

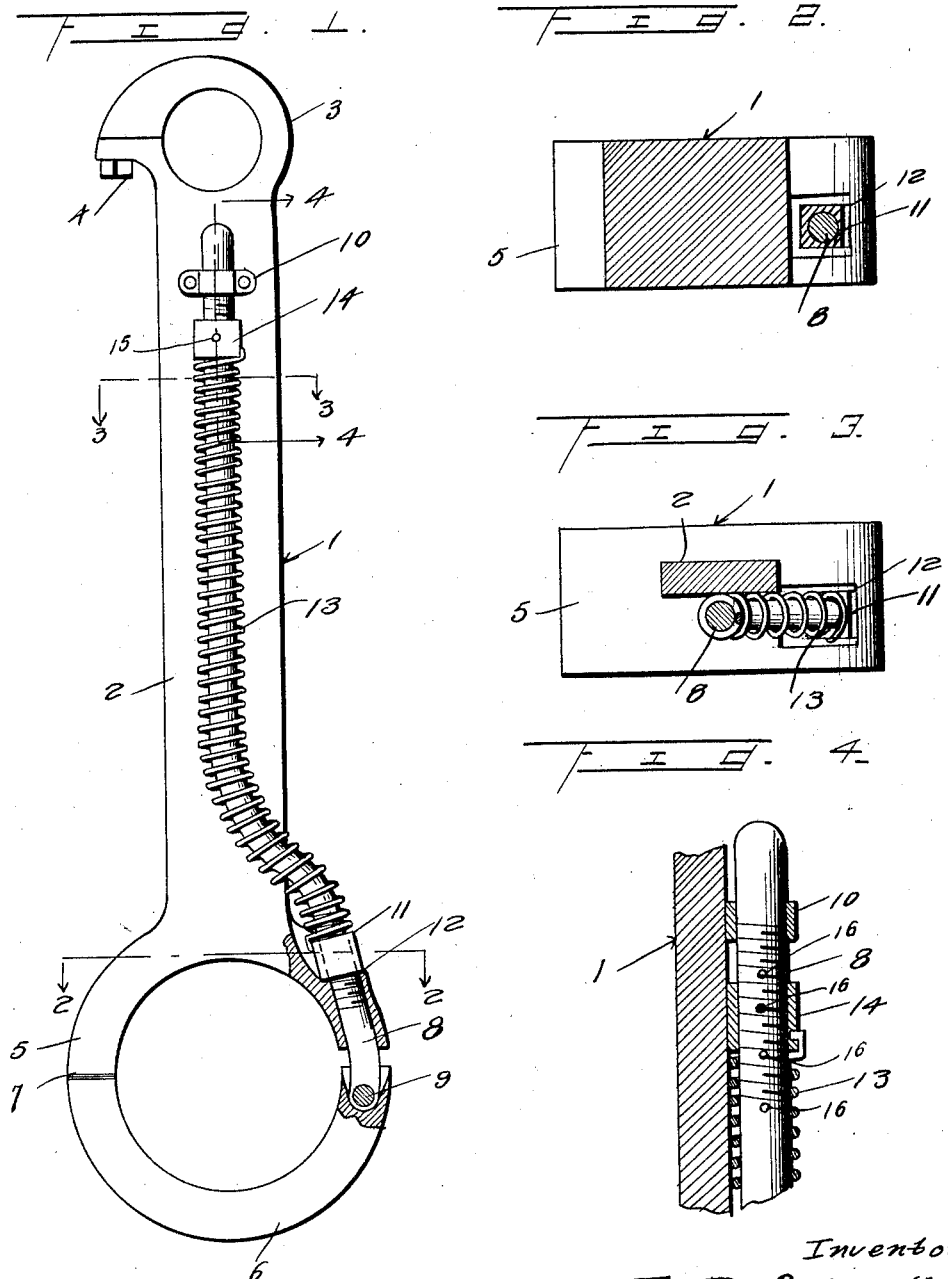

EDWARD R. SCHNELLE, OF PAVO, GEORGIA.

CONNECTING-ROD.

1,385,894.  Specification of Letters Patent.  Patented July 26, 1921.

Application filed December 16, 1919. Serial No. 345,358.

*To all whom it may concern:*

Be it known that I, EDWARD R. SCHNELLE, a citizen of the United States, residing at Pavo, in the county of Thomas and State of Georgia, have invented certain new and useful Improvements in Connecting-Rods; and I do hereby declare the following to be a full, clear, and exact description of the invention, such as will enable others skilled in the art to which it appertains to make and use the same.

This invention relates to new and useful improvements in connecting rods and has for one of its objects the provision of means which will automatically tighten the connecting rod on the crank shaft as the bearing of the same and the crank shaft become worn, thereby obviating the necessity of disassembling the engine to take up the wear in said parts and further eliminating knocks and uneven running of the engine.

Another object of this invention is the provision of a connecting rod of the above stated character, which shall be simple, durable, and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawing, in which:—

Figure 1 is a side elevation of a connecting rod constructed in accordance with my invention, Fig. 2 is a transverse sectional view taken on the line 2—2 of Fig. 1, illustrating the mounting of the adjusting nuts, Fig. 3 is a similar view taken on the line 3—3 of Fig. 1.

Fig. 4 is a sectional view taken on the line 4—4 of Fig. 1.

Referring in detail to the drawing, the numeral 1 indicates as an entirety a connecting rod consisting of a body 2 having formed upon one end a split head 3 for receiving the usual wrist pin (not shown). The ends of the split head 3 are secured together by a set bolt 4. The other end of the body 2 is enlarged to form a semi-circular bearing section 5 which coöperates with a movable bearing section 6 in supporting a babbitt bearing (not shown) and which usually surrounds the crank or bearing portion of a crank shaft (not shown). One end of the section 6 is hinged to one end of the section 5 as illustrated at 7 while the other end of the section 5 is provided with an opening to slidably receive one end of a rod 8, said end of the rod 8 is pivoted to the other end of the section 6 as shown at 9 and the other end of said rod is slidably received within a bracket 10 secured to the body 2 adjacent the split head 3. The rod 8 is provided with screw threads as clearly shown in the drawing, and has threaded thereon an adjusting nut 11. The adjusting nut 11 is adapted to bear against a shoulder 12 formed on one end of the section 5 and which end is provided with the opening to slidably receive the rod 8. A coil spring 13 surrounds the rod 8 and has one end secured to the adjusting nut 11 while the other end is secured to a set nut 14 threaded on the other end of the rod adjacent the bracket 10. By moving the set or torsion nut 14 on the rod 8 the spring 13 will be placed under torsion and as soon as there is any play between the connecting rod and the crank shaft (not shown), the adjusting nut 11 will be turned on the rod by the influence of the spring drawing the movable section 6 in the direction of the section 5 taking up the wear between said parts. The set or torsion nut 14 is provided with an opening 15 for receiving a cotter key adapted to be inserted within any one of the openings 16 in the upper end of the rod 8 so as to lock the nut 14 against accidental rotation.

While I have shown and described the preferred embodiment of my invention, it will be understood that minor changes in construction, combination, and arrangement of parts may be made without departing from the spirit and scope of the invention as claimed.

Having thus described my invention, what I claim is:—

A connecting rod comprising a body, means at one end of the body to receive a wrist pin, a bearing section formed on the other end of the body and having an opening in one end, a movable bearing section having one end hinged to the first bearing section, a screw threaded rod slidably secured to the body and extending through the opening and pivoted to the free end of the movable bearing section, torsion and adjusting nuts threaded on said rod and the latter bearing against the first named section, a coil spring surrounding said rod and secured to the nuts and adapted to rotate the adjusting nut on said rod when wear occurs in the bearing sections, and means for locking the torsion nut against accidental rotation.

In testimony whereof I affix my signature in presence of two witnesses.

EDWARD R. SCHNELLE.

Witnesses:
 Z. T. WILLIAM,
 T. N. REDDICK.